(12) United States Patent
Okamoto (10) Patent No.: US 11,859,712 B2
(45) Date of Patent: Jan. 2, 2024

(54) AUTOMATIC TRANSMISSION

(71) Applicant: ISUZU MOTORS LIMITED, Tokyo (JP)

(72) Inventor: Takefumi Okamoto, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 135 days.

(21) Appl. No.: 17/442,332

(22) PCT Filed: Mar. 24, 2020

(86) PCT No.: PCT/JP2020/013081
§ 371 (c)(1),
(2) Date: Sep. 23, 2021

(87) PCT Pub. No.: WO2020/196541
PCT Pub. Date: Oct. 1, 2020

(65) Prior Publication Data
US 2022/0154817 A1 May 19, 2022

(30) Foreign Application Priority Data
Mar. 25, 2019 (JP) .................................. 2019-057110

(51) Int. Cl.
*F16H 3/00* (2006.01)
*F16H 61/02* (2006.01)
(Continued)

(52) U.S. Cl.
CPC ............. *F16H 61/02* (2013.01); *F16H 3/091* (2013.01); *F16H 61/688* (2013.01)

(58) Field of Classification Search
CPC .......... F16H 3/006; F16H 61/02; F16H 3/091; F16H 61/688
(Continued)

(56) References Cited

U.S. PATENT DOCUMENTS 5,181,431 A * 1/1993 Zaiser ..................... F16H 3/006
192/48.8
7,392,721 B2 * 7/2008 Pollak ..................... F16H 61/20
74/330
(Continued)

FOREIGN PATENT DOCUMENTS

CN 101946105 A 1/2011
CN 104220790 A 12/2014
(Continued)

OTHER PUBLICATIONS

International Search Report from International Application No. PCT/JP2020/013081, dated Jun. 16, 2020.

*Primary Examiner* — Ha Dinh Ho
(74) *Attorney, Agent, or Firm* — Shih IP Law Group, PLLC.

(57) ABSTRACT

An automatic transmission equipped with: a plurality of rotary shafts, including an output shaft for outputting driving force; a plurality of gears, including an output-side gear provided on the output shaft; a plurality of synchronization mechanisms, including an output-side synchronization mechanism for coupling the output shaft and the output-side gear; a shift position detection unit for detecting which of a plurality of shift positions, including a neutral position and a neutral position, has been selected; and a control unit for activating a synchronization mechanism other than the output-side synchronization mechanism and coupling a rotary shaft other than the output shaft and a gear other than the output-side gear when the shift position detection unit has detected the neutral position or a parking position.

1 Claim, 6 Drawing Sheets

(51) Int. Cl.
*F16H 61/688* (2006.01)
*F16H 3/091* (2006.01)

(58) Field of Classification Search
USPC .......................................... 74/330, 331, 333
See application file for complete search history.

(56) References Cited

U.S. PATENT DOCUMENTS

| | | | | |
|---|---|---|---|---|
| 7,867,138 | B2* | 1/2011 | Earp | F16H 61/0059 |
| | | | | 74/331 |
| 8,418,575 | B2* | 4/2013 | Schneider | F16H 61/0403 |
| | | | | 477/76 |
| 9,303,731 | B2* | 4/2016 | Martin | F16H 3/083 |
| 10,899,335 | B2* | 1/2021 | Ruybal | B60K 6/26 |
| 11,325,455 | B2* | 5/2022 | Park | B60K 6/26 |
| 11,364,789 | B2* | 6/2022 | Park | B60K 6/547 |
| 2011/0042177 | A1 | 2/2011 | Bauer | |
| 2015/0072831 | A1 | 3/2015 | Sakata | |
| 2017/0096137 | A1 | 4/2017 | Toyama | |
| 2017/0248198 | A1 | 8/2017 | Taka | |

FOREIGN PATENT DOCUMENTS

| | | |
|---|---|---|
| CN | 107131259 A | 9/2017 |
| JP | 04-262166 A | 9/1992 |
| JP | 2007-040439 A | 2/2007 |
| JP | 2007-147057 A | 6/2007 |
| JP | 2017-072181 A | 4/2017 |

\* cited by examiner

AUTOMATIC TRANSMISSION

TECHNICAL FIELD

The present disclosure relates to an automatic transmission.

BACKGROUND ART

Patent Literature (hereinafter, referred to as "PTL") 1 discloses a dual clutch type transmission in which a dual clutch device having two clutches is provided between an engine and a transmission so that power transmission from the engine to the transmission can be switched between two systems.

CITATION LIST

Patent Literature

PTL 1
Japanese Patent Application Laid-Open No. 2017-72181

SUMMARY OF INVENTION

Technical Problem

In the automatic transmission as disclosed in PTL 1, when a driver performs a quick operation of a shift lever in starting or speed shifting, the automatic transmission cannot respond to the operation, which makes the driver to feel discomfort in some cases.

An object of the present invention is to provide an automatic transmission capable of responding to a quick operation of a driver.

Solution to Problem

An automatic transmission according to an aspect of the present disclosure includes: a plurality of rotary shafts including an output shaft that outputs a drive force; a plurality of gears including an output-side gear provided on the output shaft; a plurality of synchromesh mechanisms including an output-side synchromesh mechanism that couples between the output shaft and the output-side gear; a shift position detection section that detects which of a plurality of shift positions including a neutral position and a parking position is selected; and a control section that actuates at least one of the plurality of synchromesh mechanisms other than the output-side synchromesh mechanism and causes the at least one of the plurality of synchromesh mechanisms to couple between at least one of the plurality of rotary shafts other than the output shaft and at least one of the plurality of gears other than the output-side gear, in a case where the neutral position or the parking position is detected by the shift position detection section.

Advantageous Effects of Invention

According to the present disclosure, it is possible to respond to a quick operation of a driver.

DESCRIPTION OF EMBODIMENTS

Hereinafter, an embodiment of the present invention will be described in detail with reference to the accompanying drawings. The embodiment described below is an example and does not limit the present invention.

Figure 1:
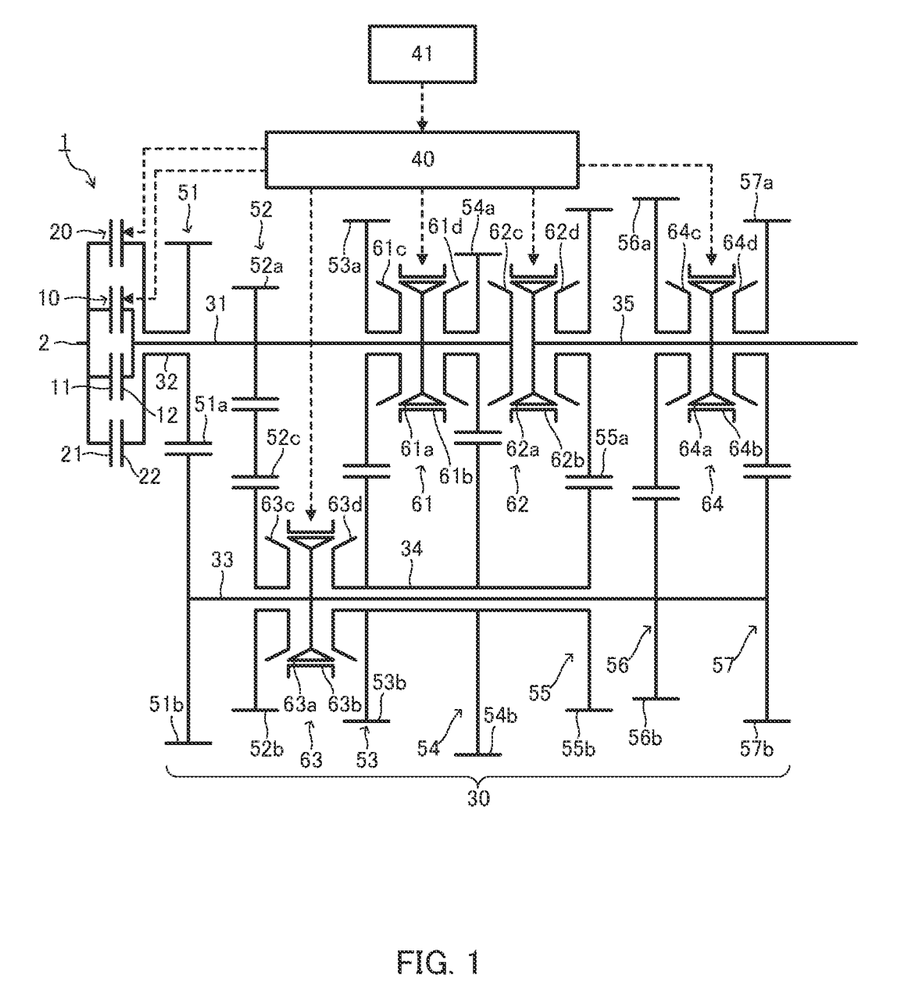
FIG. 1 is a schematic view for describing an overall configuration of an automatic transmission according to an embodiment of the present invention.

First, with reference to FIG. 1, a description will be given of an overall configuration of automatic transmission 1 according to an embodiment of the present invention. As illustrated in FIG. 1, automatic transmission 1 is a dual clutch type transmission. A left side in FIG. 1 is a front side of automatic transmission 1, whereas a right side in FIG. 1 is a rear side of automatic transmission 1.

Automatic transmission 1 includes first clutch 10, second clutch 20, and transmission section 30. Automatic transmission 1 is mounted on, for example, a vehicle such as a truck (not illustrated). In addition, drive wheels are coupled, via a propeller shaft, differential and a drive shaft which are not illustrated, to an output-side of transmission section 30 so that power can be transmitted.

First clutch 10 is, for example, a wet multi-plate clutch that is hydraulically actuated and includes a plurality of input-side clutch plates 11 and a plurality of output-side clutch plates 12. Input-side clutch plate 11 rotates integrally with output shaft 2 of a power source (e.g., an engine or a motor, neither is illustrated). Output-side clutch plate 12 rotates integrally with first input shaft 31 of transmission section 30.

First clutch 10 is energized in a disconnection direction by a return spring (not illustrated) and enters a connected state when a control hydraulic pressure is supplied into a hydraulic-oil chamber of a piston (not illustrated) and the piston moves to bring input-side clutch plates 11 and output-side clutch plates 12 into pressure-contact with each other. When first clutch 10 enters the connected state, a drive force of the power source is transmitted to first input shaft 31. Connection and disconnection of first clutch 10 are controlled by control section 40.

Second clutch 20 is provided on an outer circumferential side of first clutch 10. In the present embodiment, a description will be given with an example in which second clutch 20 is provided on an outer circumferential side of first clutch 10; however, an arrangement relationship between first clutch 10 and second clutch 20 is not limited to this arrangement. For example, second clutch 20 may be provided on a front side or a rear side of first clutch 10.

Second clutch 20 for example, a wet multi-plate clutch that is hydraulically actuated and includes a plurality of input-side clutch plates 21 and a plurality of output-side clutch plates 22. Input-side clutch plate 21 rotates integrally with output shaft 2 of the power source. Output-side clutch plate 22 rotates integrally with second input shaft 32 of transmission section 30.

Second clutch 20 is energized in a disconnection direction by a return spring (not illustrated) and enters a connected state when a control hydraulic pressure is supplied into a hydraulic-oil chamber of a piston (not illustrated) and the piston moves to bring input-side clutch plates 21 and output-side clutch plates 22 into pressure-contact with each other. When second clutch 20 enters the connected state, a drive force of the power source is transmitted to second input shaft 32. Connection and disconnection of second clutch 20 are controlled by control section 40.

Transmission section 30 includes first input shaft 31 connected to an output side of first clutch 10 and second input shaft 32 connected to an output side of second clutch 20. Transmission section 30 includes first counter shaft 33 and second counter shaft 34 which are arranged in parallel to first input shaft 31 and second input shaft 32. Transmission section 30 further includes output shaft 35 provided coaxially with first input shaft 31 and second input shaft 32.

First input shaft 31 is pivotably supported by a transmission case (not illustrated) via a bearing (not illustrated). Second input-side gear 52a that functions as a reverse gear is fixed to an intermediate portion in a front-rear direction of first input shaft 31.

First synchronizer hub 61a of first synchromesh mechanism 61 (to be described later) is fixed on a rear stage of second input-side gear 52a of first input shaft 31.

Between second input-side gear 52a and first synchronizer hub 61a, third input-side gear 53a is provided to be relatively rotatable to first input shaft 31.

On a rear stage of first synchronizer hub 61a, fourth input-side gear 54a is provided relatively rotatable to first input shaft 31.

Second input shaft 32 is a hollow shaft into which first input shaft 31 is inserted and is pivotably supported so as to be relatively rotatable by first input shaft 31 via a bearing (not illustrated). First input-side gear 51a is fixed to a rear end portion of second input shaft 32. First input-side gear 51a is provided on the front side of second input gear 52a.

First counter shaft 33 is pivotably supported by the transmission case (not illustrated) via a bearing (not illustrated). First counter gear 51b, third synchronizer hub 63a of third synchromesh mechanism 63 (to be described later), sixth counter gear 56b, and seventh counter gear 57b are fixed to first counter shaft 33 in this order from the front side.

First counter gear 51b is always in mesh with first input-side gear 51a. First input-side gear 51a and first counter gear 51b constitute first gear train 51.

Between first counter gear 51b and third synchromesh mechanism 63, second counter gear 52b is provided to be relatively rotatable to first counter shaft 33. Second counter gear 52b is always in mesh with second input-side gear 52a via reverse idler gear 52c. Second input-side gear 52a, reverse idler gear 52c, and second counter gear 52b constitute reverse gear train 52. Second counter shaft 34 is provided between third synchromesh mechanism 63 and sixth counter gear 56b.

Second counter shaft 34 is a hollow shaft into which first counter shaft 33 is inserted and is pivotably supported so as to be relatively rotatable by first counter shaft 33 via a bearing (not illustrated). Third counter gear 53b is fixed to a front-side portion of second counter shaft 34. Third counter gear 53b is always in mesh with third input-side gear 53a. Third input-side gear 53a and third counter gear 53b constitute second gear train 53.

Fourth counter gear 54b is fixed on a rear stage of third counter gear 53b of second counter shaft 34. Fourth counter gear 54b is always in mesh with fourth input-side gear 54a.

Fourth input-side gear 54a and fourth counter gear 54b constitute third gear train 54. Fifth counter gear 55b is fixed to a rear end portion of second counter shaft 34.

Output shaft 35 is pivotably supported by the transmission case (not illustrated) via a bearing (not illustrated). Second synchronizer hub 62a of second synchromesh mechanism 62 (to be described later) is fixed to a front end portion of output shaft 35. Fourth synchronizer hub 64a of fourth synchromesh mechanism 64 (to be described later) is fixed on a rear stage of second synchronizer hub 62a of output shaft 35.

Between second synchronizer hub 62a and fourth synchronizer hub 64a, first output-side gear 55a is provided to be relatively rotatable to output shaft 35. First output-side gear 55a is always in mesh with fifth counter gear 55b. First output-side gear 55a and fifth counter gear 55b constitute fourth gear train 55.

Between first output-side gear 55a and fourth synchronizer hub 64a, second output-side gear 56a is provided to be relatively rotatable to output shaft 35. Second output-side gear 56a is always in mesh with sixth counter gear 56b. Second output-side gear 56a and sixth counter gear 56b constitute fifth gear train 56.

On a rear stage of fourth synchronizer hub 64a, third output-side gear 57a is provided to be relatively rotatable to output shaft 35. Third output-side gear 57a is always in mesh with seventh counter gear 57b. Third output-side gear 57a and seventh counter gear 57b constitute sixth gear train 57.

Transmission section 30 includes first synchromesh mechanism 61, second synchromesh mechanism 62, third synchromesh mechanism 63, and fourth synchromesh mechanism 64.

First synchromesh mechanism 61 includes first synchronizer hub 61a, first synchronizer sleeve 61b, first dog gear 61c, and second dog gear 61d. As described above, first synchronizer hub 61a is fixed to first input shaft 31.

First synchronizer sleeve 61b is provided to surround first synchronizer hub 61a. First synchronizer sleeve 61b has internal spline teeth engaged with external spline teeth of first synchronizer hub 61a. First synchronizer sleeve 61b rotates integrally with first synchronizer hub 61a and is movable with respect to first synchronizer hub 61a in the front-rear direction.

First dog gear 61c is provided on a rear side of third input-side gear 53a. Second dog gear 61d is provided on a front side of fourth input-side gear 54a. Synchronizer rings (not illustrated) are provided one each between first synchronizer hub 61a and first dog gear 61c and between first synchronizer hub 61a and second dog gear 61d. The internal spline teeth of first synchronizer sleeve 61b are selectively engageable with either one of external spline teeth of first dog gear 61c or external spline teeth of second dog gear 61d.

First synchromesh mechanism 61 is configured to synchronously couple first input shaft 31 selectively to third input-side gear 53a or fourth input-side gear 54a in response to first synchronizer sleeve 61b being moved by a shift fork (not illustrated) and engaged with first dog gear 61c or second dog gear 61d. An actuation of first synchromesh mechanism 61 is controlled by control section 40.

Second synchromesh mechanism 62 includes second synchronizer hub 62a, second synchronizer sleeve 62b, third dog gear 62c, and fourth dog gear 62d. As described above, second synchronizer hub 62a is fixed to output shaft 35.

Second synchronizer sleeve 62b is provided to surround second synchronizer hub 62a. Second synchronizer sleeve 62b has internal spline teeth engaged with external spline teeth of second synchronizer hub 62a. Second synchronizer sleeve 62b rotates integrally with second synchronizer hub 62a and is movable with respect to second synchronizer hub 62a in the front-rear direction.

Third dog gear 62c is provided on a rear end portion of first input shaft 31. Fourth dog gear 62d is provided on a front side of first output-side gear 55a. Synchronizer rings (not illustrated) are provided one each between second synchronizer hub 62a and third dog gear 62c and between second synchronizer hub 62a and fourth dog gear 62d. The internal spline teeth of second synchronizer sleeve 62b are selectively engageable with either one of external spline teeth of third dog gear 62c or external spline teeth of fourth dog gear 62d.

Second synchromesh mechanism 62 is configured to synchronously couple output shaft 35 selectively to first input shaft 31 or first input-side gear 55a in response to second synchronizer sleeve 62b being moved by a shift fork (not illustrated) and engaged with third dog gear 62c or fourth dog gear 62d. An actuation of second synchromesh mechanism 62 is controlled by control section 40.

Third synchromesh mechanism 63 includes third synchronizer hub 63a, third synchronizer sleeve 63b, fifth dog gear 63c, and sixth dog gear 63d. As described above, third synchronizer hub 63a is fixed to first countershaft 33.

Third synchronizer sleeve 63b is provided to surround third synchronizer hub 63a. Third synchronizer sleeve 63b has internal spline teeth engaged with external spline teeth of third synchronizer hub 63a. Third synchronizer sleeve 63b rotates integrally with third synchronizer hub 63a and is movable with respect to third synchronizer hub 63a in the front-rear direction.

Fifth dog gear 63c is provided on a rear side of second counter gear 52b. Sixth dog gear 63d is provided on a front end portion of second counter shaft 34. Synchronizer rings (not illustrated) are provided one each between third synchronizer hub 63a and fifth dog gear 63c and between third synchronizer hub 63a and sixth dog gear 63d. The internal spline teeth of third synchronizer sleeve 63b are selectively engageable with either one of external spline teeth of fifth dog gear 63c or external spline teeth of sixth dog gear 63d.

Third synchromesh mechanism 63 is configured to synchronously couple first counter shaft 33 selectively to second counter gear 52b or second counter shaft 34 in response to third synchronizer sleeve 63b being moved by a shift fork (not illustrated) and engaged with fifth dog gear 63c or sixth dog gear 63d. An actuation of third synchromesh mechanism 63 is controlled by control section 40.

Fourth synchromesh mechanism 64 includes fourth synchronizer hub 64a, fourth synchronizer sleeve 64b, seventh dog gear 64c, and eighth dog gear 64d. As described above, fourth synchronizer hub 64a is fixed to output shaft 35.

Fourth synchronizer sleeve 64b is provided to surround fourth synchronizer hub 64a. Fourth synchronizer sleeve 64b has internal spline teeth that engage with the external spline teeth of fourth synchronizer hub 64a. Fourth synchronizer sleeve 64b rotates integrally with fourth synchronizer hub 64a and is movable with respect to fourth synchronizer hub 64a in the front-rear direction.

Seventh dog gear 64c is provided on a rear side of second output-side gear 56a. Eighth dog gear 64d is provided on a front side of third output-side gear 57a. Synchronizer rings (not illustrated) are provided one each between fourth synchronizer hub 64a and seventh dog gear 64c and between fourth synchronizer hub 64a and eighth dog gear 64d. The internal spline teeth of fourth synchronizer sleeve 64b are selectively engageable with either one of external spline teeth of seventh dog gear 64c and external spline teeth of eighth dog gear 64d.

Fourth synchromesh mechanism 64 is configured to synchronously couple output shaft 35 selectively to second output-side gear 56a or third output-side gear 57a in response to fourth synchronizer sleeve 64b being moved by a shift fork (not illustrated) and engaged with seventh dog gear 64c or eighth dog gear 64d. An actuation of fourth synchromesh mechanism 64 is controlled by control section 40.

Shift position detection section 41 detects a shift position selected by an operation of a driver on a shift lever (not illustrated). Shift position detection section 41 is connected to control section 40.

The configuration of automatic transmission 1 according to the present embodiment has been described above. Note that, FIG. 1 is a diagram for describing the configuration of automatic transmission 1, and thus, the respective positions of first synchronizer sleeve 61b, second synchronizer sleeve 62b, third synchronizer sleeve 63b, fourth synchronizer sleeve 64b, which are configured to be movable, are not engaged with any of the dog gears.

First input shaft 31, second input shaft 32, first counter shaft 33, second counter shaft 34, and output shaft 35 described above are examples of a rotary shaft of the present invention; in the following description, these shafts may be collectively referred to as the rotary shaft. Moreover, first input-side gear 51a, second input-side gear 52a, third input-side gear 53a, fourth input-side gear 54a, first counter gear 51b, second counter gear 52b, third counter gear 53b, fourth counter gear 54b, fifth counter gear 55b, sixth counter gear 56b, reverse idler gear 52c, first output-side gear 55a, second output-side gear 56a, and third output-side gear 57a described above are examples of a gear of the present invention; in the following description, these gears may be collectively referred to simply as the gear. Furthermore, first synchromesh mechanism 61, second synchromesh mechanism 62, third synchromesh mechanism 63, and fourth synchromesh mechanism 64 described above are examples of a synchromesh mechanism of the present invention; in the following description, these mechanisms may be collectively referred to simply as the synchromesh mechanism.

<Control by Control Section 40>

Hereinafter, a control by control section 40 will be described. Control section 40 controls actuation of first clutch 10 or second clutch 20 and actuation of the respective synchromesh mechanisms, and thereby controls a speed shifting operation in automatic transmission 1. More specifically, for example, when actuating first synchromesh mechanism 61, automatic transmission 1 moves first synchronizer sleeve 61b by controlling a hydraulic actuator (not illustrated) that moves the shift fork (not illustrated), and engages first synchronizer sleeve 61b with first dog gear 61c or second dog gear 61d, and thereby causes synchromesh mechanism 61 to synchronously couple first input shaft 31 selectively to third input-side gear 53a or fourth input-side gear 54a. Control section 40 controls a synchromesh mechanism based on a shift position detected by shift position detection section 41 to couple the desired rotary shaft with the desired gear, and thereby switches automatic transmission 1 to the desired speed shifting stage.

In particular, control section 40 actuates first synchromesh mechanism 61 and puts the other synchromesh mechanisms into a neutral state when shift position detection section 41 detects a change to a neutral position. Note that, the neutral state of a synchromesh mechanism means a state in which a coupling between the rotary shaft and the gear made by the synchromesh mechanism is released. That is, control section 40 does not release all of the couplings between the rotary shafts and the gears made by the synchromesh mechanism even when the neutral position is selected by the driver, but a point corresponding to synchromesh mechanism 61 is left coupled. Incidentally, application of this control is not limited to when detecting a change to the neutral position of the shift lever; the control may be applied when detecting a change to a shift lever position causing a situation in which the drive force of the drive source is not transmitted to output shaft 35, for example, a parking position which is a shift lever position for parking in a common automatic transmission.

Hereinafter, a description will be given of a control by control section 40 in a case where a neutral or parking position is detected by shift position detection section 41 in automatic transmission 1 according to the embodiment of the present invention.

Figure 2:
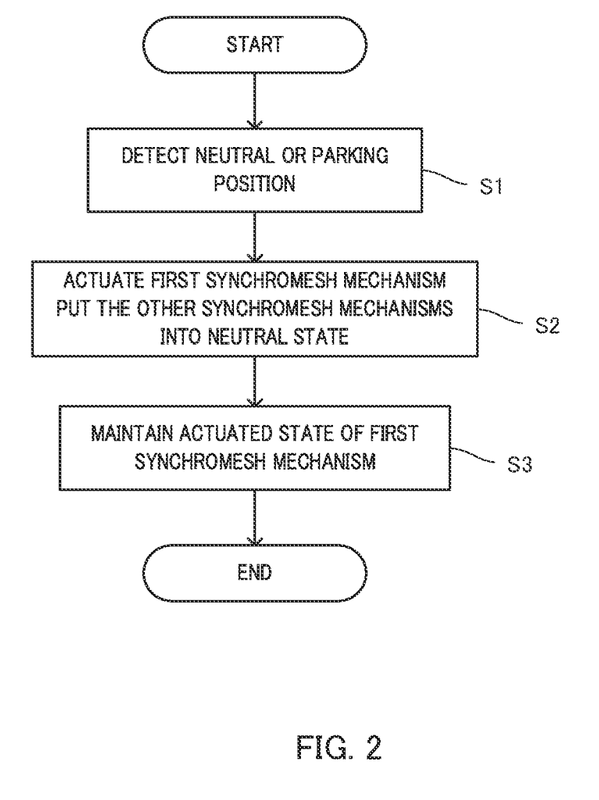
FIG. 2 is a flowchart for describing a control by a control section in a case where a neutral or parking position is detected by a shift position detection section.

FIG. 2 is a flowchart for describing a control by control section 40 in a case where a neutral or parking position by shift position detection section 41.

In step S1, control section 40 receives, from shift position detection section 41, a signal indicating that a neutral or parking position has been detected. Thus, control section 40 detects that the shift lever has been operated to the neutral or parking position by the driver.

Incidentally, the driver operates the shift lever to the neutral or parking position in the following cases, for example. The first case is when the driver parks a vehicle equipped with automatic transmission 1. In such a case, the driver generally operates the shift lever to the neutral or parking position and operates a parking brake to park. The second case is when it is assumed in advance that the vehicle cannot be started for a while, such as in signal waiting or congestion. In such a case, the driver may operate the shift lever to the neutral or parking position and set a foot brake, the parking brake, or the like into an actuated state.

When it is detected that the shift lever has been operated in the neutral or parking position in step S1 in this manner, control section 40, in step S2, actuates first synchromesh mechanism 61 and puts second synchromesh mechanism 62, third synchromesh mechanism 63, and fourth synchromesh mechanism 64 into a neutral state.

As described above, actuation of first synchromesh mechanism 61 is to move and thus engage first synchronizer sleeve 61b with first dog gear 61c or second dog gear 61d. Here, as an example, control section 40 engages first synchronizer sleeve 61b with second dog gear 61d. That is, in step S2, control section 40 controls first synchromesh mechanism 61 to synchronously couple between first input shaft 31 and fourth input-side gear Ma.

In step S3, control section 40 maintains an actuated state of first synchromesh mechanism 61 which has been actuated in step S2. As a result, first synchromesh mechanism 61 remains actuated, and first input shaft 31 and fourth input-side gear Ma remain in a synchronously coupled state, while the shift position is in the neutral or parking position.

Figure 3:
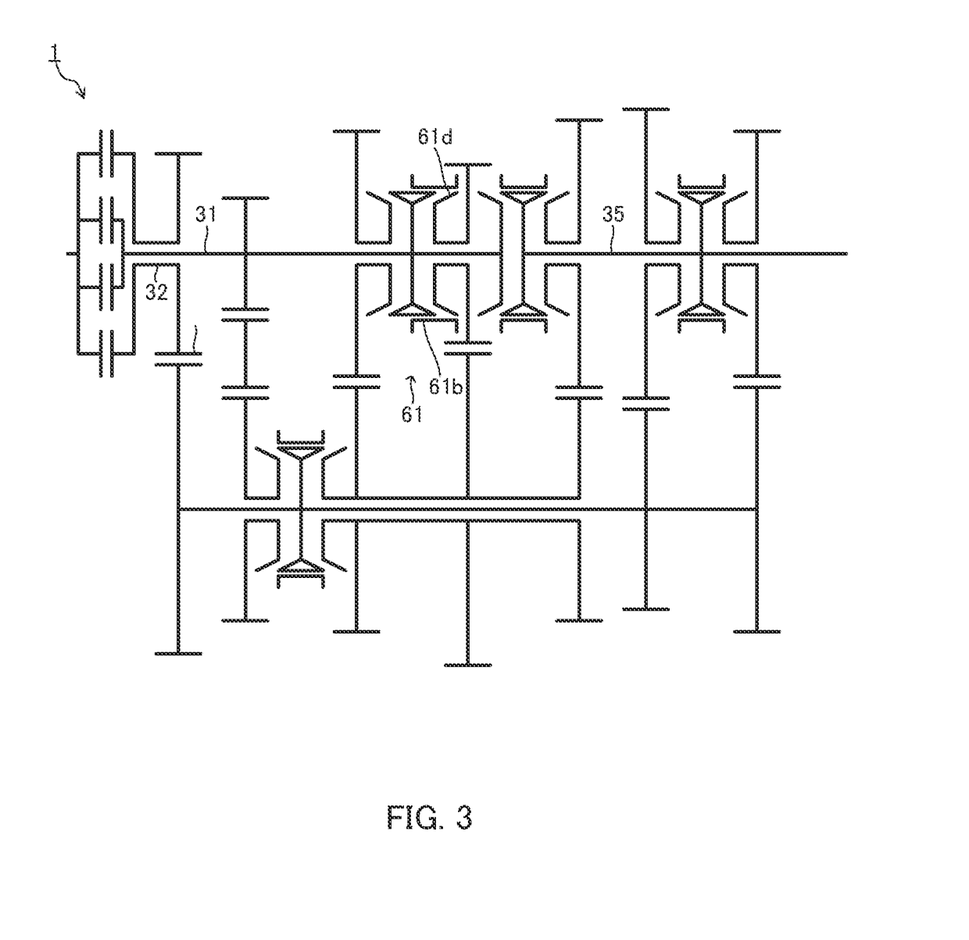
FIG. 3 is a schematic view of an actuated state of the first synchromesh mechanism at the neutral or parking position of the automatic transmission according to the embodiment of the present invention.

Such control allows first synchromesh mechanism 61 to remain in the actuated state at the neutral or parking position of the shift lever. FIG. 3 is a schematic view for describing an actuated state of first synchromesh mechanism 61 at the neutral or parking position of automatic transmission 1 according to the embodiment of the present invention. In FIG. 3, first synchronizer sleeve 61b is moved to be engaged with second dog gear 61d as described above.

DESCRIPTION OF EFFECT

In the following, a specific description will be given of an effect generated by the control by control section 40 described in FIG. 2 in automatic transmission 1 according to the embodiment of the present invention.

When it is detected that the driver has operated the shift lever to a drive position in a vehicle parked or stopped with the shift lever in the neutral or parking position, control section 40 performs a starting control for automatic transmission 1. The starting control is a control to establish a drive force transmission path of a predetermined speed shifting stage. Note that, in the following description, the speed shifting stage used when starting the vehicle will be described as a starting stage.

It should be noted that a method for determining which starting stage control section 40 uses is not particularly limited in the present invention when the shift lever is operated by the driver from the neutral or parking position to the drive position. A starting stage may be determined by control section 40 by using, for example, a method in which the driver optionally selects by the shift lever or an input means (not illustrated), a method of determining one speed shifting stage for starting in advance, or a method in which weight of the vehicle is measured by a sensor (not illustrated) or the like, and the starting stage is determined at the time of starting based on the vehicle weight.

First Example

As the first example, a case where the first speed shifting stage is used as the starting stage will be described.

Figure 4:
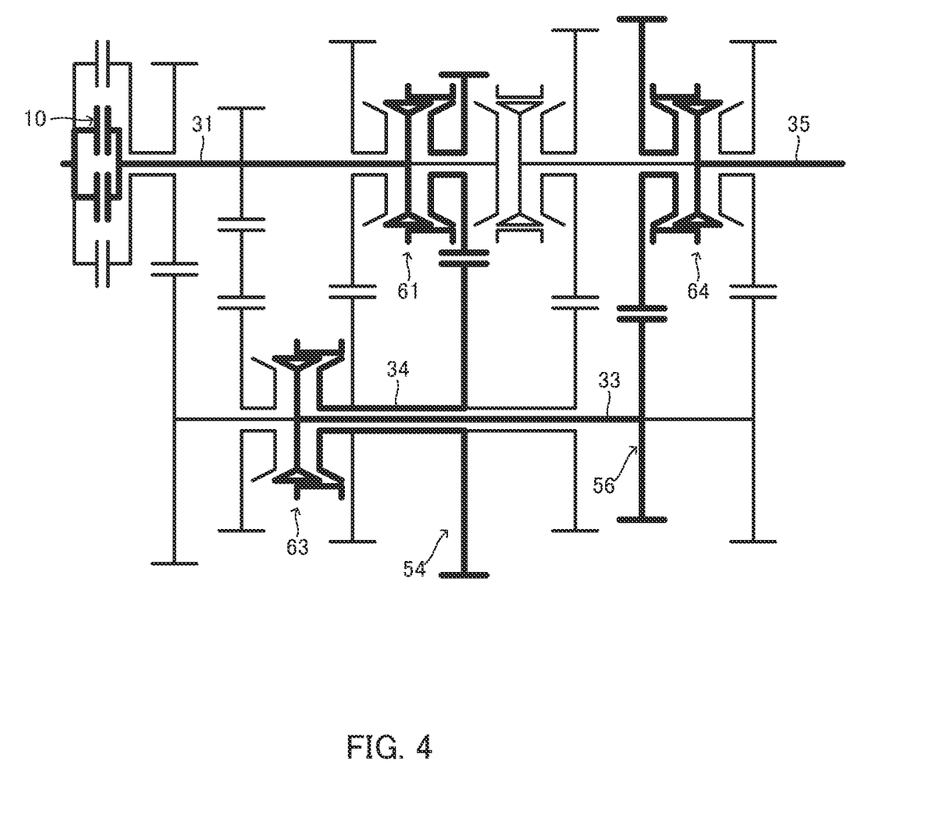
FIG. 4 is a schematic view of a drive force transmission path at the first speed shifting stage.

FIG. 4 is a schematic view of a drive force transmission path at the first speed shifting stage. In the first speed shifting stage illustrated in FIG. 4, first clutch 10 is connected, first input shaft 31 and fourth input-side gear 54a are coupled by first synchromesh mechanism 61, second counter shaft 34 and first counter shaft 33 are coupled by third synchromesh mechanism 63, and second output-side gear 56a and output shaft 35 are coupled by fourth synchromesh mechanism 64.

That is, the drive force transmission path of the first speed shifting stage is a path passing through in the following order; first clutch 10→first input shaft 31→first synchromesh mechanism 61→third gear train 54→second counter shaft 34→third synchromesh mechanism 63→first counter shaft 33→fifth gear train 56→fourth synchromesh mechanism 64→output shaft 35. In FIG. 4, the drive force transmission path of the first speed shifting stage is illustrated by a thick solid line.

That is, upon detecting that the shift lever has been operated from the neutral or parking position to the drive position, control section 40 actuates third synchromesh mechanism 63 and fourth synchromesh mechanism 64 while maintaining the actuated state of first synchromesh mechanism 61. When first clutch 10 is connected in this condition, the drive force is transmitted to output shaft 35, and thus the vehicle is started at the first speed shifting stage.

As described above, in automatic transmission 1 according to the embodiment of the present invention, first synchromesh mechanism 61 remains in the actuated state while the shift lever is in the neutral or parking position; thus, in a case of starting at the first speed shifting stage, the number of synchromesh mechanisms to be actuated is two (third synchromesh mechanism 63 and fourth synchromesh mechanism 64). On the other hand, in a case of starting at the first speed shifting stage from a state in which the shift lever is in the neutral or parking position while none of the synchromesh mechanisms is actuated, the number of synchromesh mechanisms to be actuated is three (first synchromesh mechanism 61, third synchromesh mechanism 63, and fourth synchromesh mechanism 64). Hence, in automatic transmission 1 according to the embodiment of the present invention, as compared with the case of starting from a state in which no synchromesh mechanism is actuated at the neutral or parking position of the shift lever, the time required until starting at the first speed shifting stage is possible from the operation of the shift lever can be shortened by the amount of actuation time of first synchromesh mechanism 61. Incidentally, here, it is assumed that simultaneously actuating a plurality of synchromesh mechanisms is difficult because rotational frequencies of the rotary shaft and the gear need to be matched. From the above, it is possible to start the vehicle immediately without causing the driver to feel discomfort even when, for example, the driver performs a start operation (stepping on an accelerator pedal) immediately after the operation of the shift lever.

Second Example

As the second example, a case where the third speed shifting stage is used as the starting stage will be described.

Figure 5:
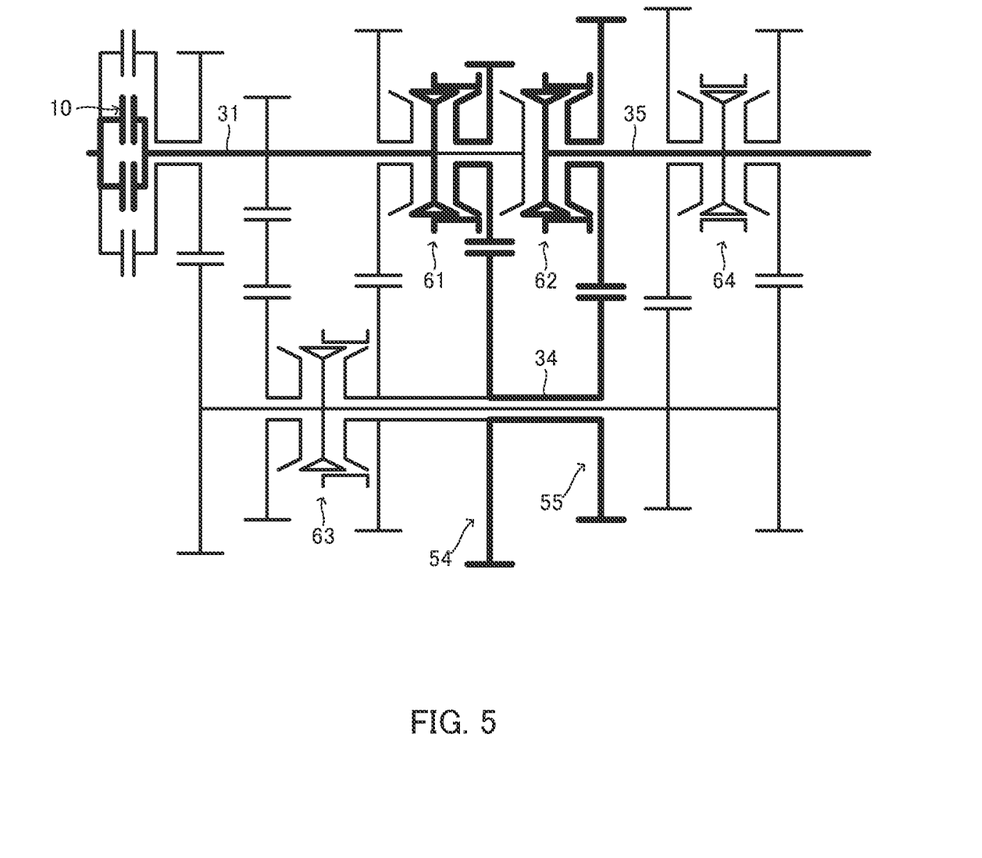
FIG. 5 is a schematic view of a drive force transmission path at the third speed shifting stage.

FIG. 5 is a schematic view of a drive force transmission path at the third speed shifting stage. In the third speed shifting stage illustrated in FIG. 5, first clutch 10 is connected, first input shaft 31 and fourth input-side gear 54a are coupled by first synchromesh mechanism 61, and first output-side gear 55a and output shaft 35 are coupled by second synchromesh mechanism 62.

That is, the drive force transmission path of the third speed shifting stage is a path passing through in the following order; first clutch 10→first input shaft 31→first synchromesh mechanism 61→third gear train 54→second counter shaft 34→fourth gear train 55→second synchromesh mechanism 62→output shaft 35. In FIG. 5, the drive force transmission path of the third speed shifting stage is illustrated by a thick solid line.

That is, upon detecting that the shift lever has been operated from the neutral or parking position to the drive position, control section 40 actuates second synchromesh mechanism 62 while maintaining the actuated state of first synchromesh mechanism 61. When first clutch 10 is connected in this condition, the drive force is transmitted to output shaft 35, and thus the vehicle is started.

As described above, in automatic transmission 1 according to the embodiment of the present invention, first synchromesh mechanism 61 remains in the actuated state while the shift lever is in the neutral or parking position; thus, in a case of starting at the third speed shifting stage, the number of synchromesh mechanisms to be actuated is only one (second synchromesh mechanism 62). On the other hand, in a case of starting at the third speed shifting stage from a state in which the shift lever is in the neutral or parking position and none of the synchromesh mechanisms is actuated, the number of synchromesh mechanisms to be actuated is two (first synchromesh mechanism 61 and second synchromesh mechanism 62). Hence, similar to the above first example, in automatic transmission 1 according to the embodiment of the present invention, as compared with the case of starting from the state in which no synchromesh mechanism is actuated at the neutral or parking position of the shift lever, the time required until starting is possible from the operation of the shift lever can be shortened by the amount of actuation time of first synchromesh mechanism 61. Thus, it is possible to start the vehicle immediately without causing the driver to feel discomfort even when, for example, the driver performs a start operation (stepping on an accelerator pedal) immediately after the operation of the shift lever.

Third Example

Figure 6:
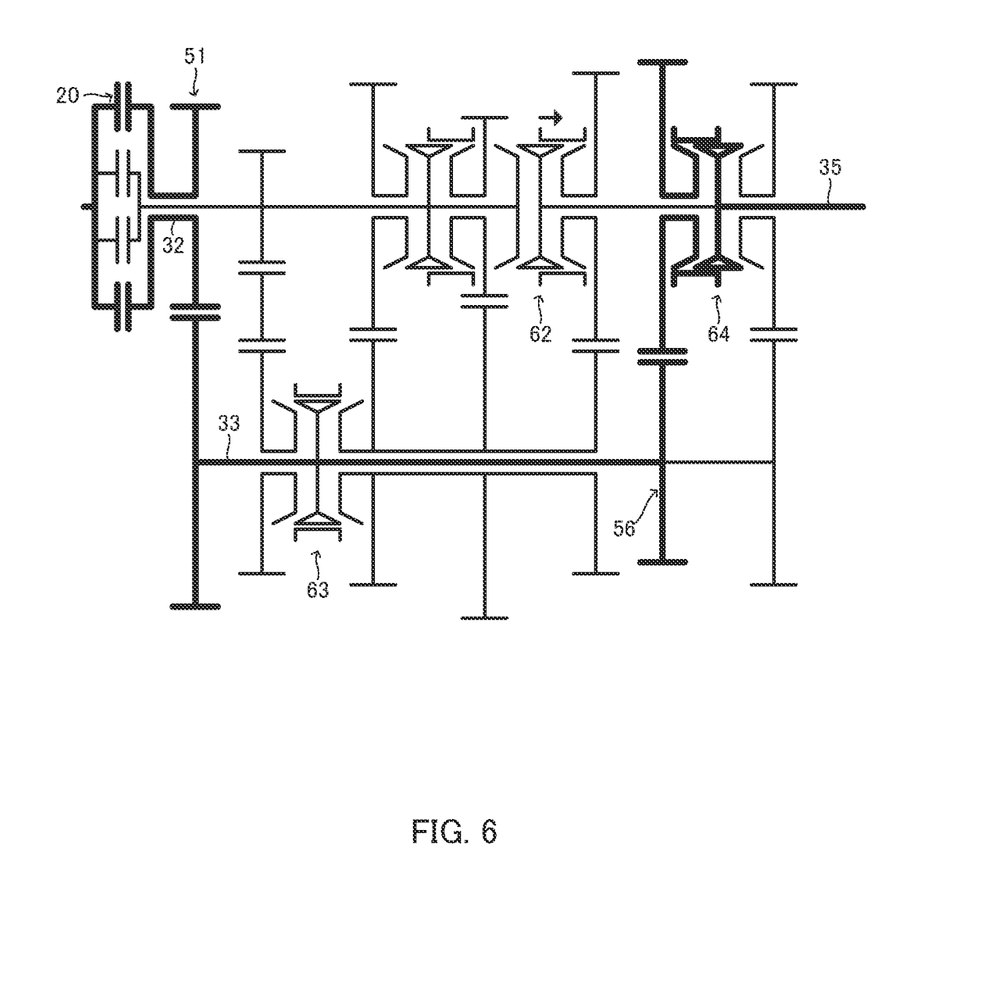
FIG. 6 is a schematic view of a drive force transmission path at the second speed shifting stage.

As the third example, a case where the second speed shifting stage is used as the starting stage will be described. FIG. 6 is a schematic view of a drive force transmission path at the second speed shifting stage. In the second speed shifting stage illustrated in FIG. 6, second clutch 20 is connected, and second output-side gear 56a and output shaft 35 are coupled by fourth synchromesh mechanism 64.

That is, the drive force transmission path of the second speed shifting stage is a path passing through in the following order; second clutch 20→second input shaft 32→first gear train 51→first counter shaft 33→fifth gear train 56→fourth synchromesh mechanism 64→output shaft 35. In FIG. 6, the drive force transmission path of the second speed shifting stage is illustrated by a thick solid line.

That is, upon detecting that the shift lever has been operated from the neutral or parking position to the drive position, control section 40 actuates fourth synchromesh mechanism 64 while maintaining the actuated state of first synchromesh mechanism 61. When second clutch 20 is connected in this condition, the drive force is transmitted to output shaft 35, and thus the vehicle is started.

In the manner described above, in automatic transmission 1 according to the embodiment of the present invention, the actuated state of first synchromesh mechanism 61 is maintained even after starting at the second speed shifting stage. However, as described above, when starting at the second speed shifting stage, first synchromesh mechanism 61 is not included in the drive force transmission path. Hence, unlike the first and third examples, even in automatic transmission 1 according to the embodiment of the present invention, the time required until starting is possible from the operation of the shift lever cannot be shortened.

However, when it becomes necessary for the vehicle to immediately upshift to the third speed shifting stage in response to, for example, the driver stepping on the accelerator pedal greatly after the vehicle is started at the second speed shifting stage, the time required until the speed shifting from the second speed shifting stage to the third speed shifting stage is possible can be shortened in automatic transmission 1 according to the embodiment of the present invention. The reasons are as follows.

Generally, in a dual clutch type transmission, when speed shifting to a certain speed shifting stage, a synchromesh mechanism not included in the drive force transmission path of the present speed shifting stage while included in a path of the next stage is actuated in advance for the purpose of performing the speed shifting to the next stage promptly. Such an operation is generally referred to as a preliminary shifting (hereinafter, may be referred to as a "pre-shift") or the like. Although a description has been omitted, for example, at the time of starting at the third speed shifting stage in the second example described above, a pre-shift operation to the fourth speed stage is performed after the drive force transmission path of the third speed shifting stage is established. The pre-shift operation to the fourth speed stage is an operation specifically for coupling between first counter shaft 33 and second counter shaft 34 by third synchromesh mechanism 63. Automatic transmission 1 after the pre-shift is illustrated in FIG. 5.

Similarly, when starting at the second speed shifting stage, the pre-shift to the third speed shifting stage is performed after the drive force transmission path of the second stage is established. Comparing automatic transmission 1 of the third speed shifting stage illustrated in FIG. 5 with automatic transmission 1 of the second speed shifting stage illustrated in FIG. 6, the number of synchromesh mechanisms to be actuated at the time of pre-shift is two (synchromesh mechanism not included in the drive force transmission path of the second speed shifting stage while included in the drive force transmission path of the third speed shifting stage); i.e., first synchromesh mechanism 61 and second synchromesh mechanism 62.

As described above, in automatic transmission 1 according to the embodiment of the present invention, the actuated state of first synchromesh mechanism 61 is maintained even after starting at the second speed shifting stage. Hence, in the pre-shift to the third speed shifting stage after the drive force transmission path of the second speed shifting stage is established, a synchromesh mechanism to be actuated is second synchromesh mechanism 62 alone.

Thus, in automatic transmission 1 according to the embodiment of the present invention, the time required until the speed shifting to the third speed shifting stage is possible after starting at the second speed shifting stage can be shortened by the amount of actuation time of first synchromesh mechanism 61, compared with the case of starting from the state in which no synchromesh mechanism is actuated at the neutral or parking position of the shift lever. As a result, in automatic transmission 1 according to the embodiment of the present invention, even when it becomes necessary to upshift to the third speed shifting stage immediately after starting at the second speed shifting stage, it is possible to immediately upshift without causing the driver to feel discomfort.

As above, a description has been given in detail of the effect of performing the control for actuating first synchromesh mechanism 61 such that first synchronizer sleeve 61*b* is engaged with second dog gear 61*d* when the shift lever is in the neutral or parking position neutral or parking position in automatic transmission 1 according to the embodiment of the present invention.

Incidentally, in the above description, the effect is described as obtainable when starting at the first speed shifting stage, the second speed shifting stage, or the third speed shifting stage, but a similar effect can be obtained when starting at another speed shifting stage. The similar effect is, for example, an effect in which the time required from the operation of the shift lever to the start can be shortened in a case where first synchromesh mechanism 61 is included in the drive force transmission path of the starting stage.

Moreover, the similar effect is, for example, an effect in which the time required until the speed shifting to the next stage is possible after starting at the starting stage can be shortened in a case where first synchromesh mechanism 61 is not included in the drive force transmission path of the starting stage while first synchromesh mechanism 61 is included in the drive force transmission path of the next stage.

In addition, the above description has assumed that first synchromesh mechanism 61 is actuated so that first synchronizer sleeve 61*b* engages with second dog gear 61*d* when the shift lever is in the neutral or parking position, but the present invention is not limited to this. That is, control section 40 may actuate another synchromesh mechanism when the shift lever is in the neutral or parking position. An example of the other synchromesh mechanism includes, for example, third synchromesh mechanism 63. The reasons are as follows.

For the viewpoint of safety, the drive force of the drive source must not be transmitted to output shaft 35 when the shift lever is in the neutral or parking position, even in a case where first clutch 10 or second clutch 20 is connected for any reason. From this viewpoint, a synchromesh mechanism that may be actuated by control section 40 when the shift lever is in the neutral or parking position is a synchromesh mechanism other than the synchromesh mechanisms (second synchromesh mechanism 62 and/or fourth synchromesh mechanism 64) that synchronously couples between output shaft 35 and the output-side gear (first output-side gear 55*a*, second output-side gear 56*a*, and/or third output-side gear 57*a*). That is, in automatic transmission 1 configured as illustrated in, for example, FIG. 1, first synchromesh mechanism 61 and third synchromesh mechanism 63 are examples of a synchromesh mechanism to be actuated by control section 40 when the shift lever is in the neutral or parking position. Note that, second synchromesh mechanism 62 or fourth synchromesh mechanism 64 is an example of an output-side synchromesh mechanism of the present invention.

In a case where control section 40 actuates third synchromesh mechanism 63 such that third synchronizer sleeve 63*b* engages with sixth dog gear 63*d*, and maintains this state while the shift lever is in the neutral or parking position, the time required from the operation of the shift lever to the start can be shortened, upon selecting the first speed shifting stage as the starting stage.

Note that, when the shift lever is in the neutral or parking position, a synchromesh mechanism to be actuated by control section 40 may not be one and may be a plurality. That is, in the above-mentioned examples, both first synchromesh mechanism 61 and third synchromesh mechanism 63 may be actuated. In such a case, when the first speed shifting stage is selected as the starting stage, the time required from the operation of the shift lever to the start can be further shortened.

The above description has assumed that second synchromesh mechanism 62 cannot be actuated by control section 40 when the shift lever is in the neutral or parking position because second synchromesh mechanism 62 may synchronously couple between output shaft 35 and first output-side gear 55*a*. However, second synchromesh mechanism 62 may be actuated, provided that first synchromesh mechanism 61 and third synchromesh mechanism are not actuated when the shift lever is in the neutral or parking position. Specifically, when the shift lever is in the neutral or parking position, control section 40 may actuate second synchromesh mechanism 62 such that second synchronizer sleeve 62*b* engages with fourth dog gear 62*d*. First input shaft 31 and second input shaft 32 are not coupled to output shaft 35 unless first synchromesh mechanism 61 and the third synchromesh mechanism are actuated, so that the drive force is not transmitted to output shaft 35 even when first clutch 10 or second clutch 20 is connected. In such a case, at the time of starting, for example, at the third speed shifting stage, the time required from the operation of the shift lever to the start can be shortened.

<Operational Effect>

Automatic transmission 1 according to an embodiment of the present invention includes: a plurality of rotary shafts including output shaft 35 that outputs a drive force; a plurality of gears including an output-side gear (first output-side gear 55*a*, second output-side gear 56*a*, and/or third output-side gear 57*a*) provided on output shaft 35; a plurality of synchromesh mechanisms including an output-side synchromesh mechanism (second synchromesh mechanism 62 and/or fourth synchromesh mechanism 64) that couples between output shaft 35 and an output-side gear; shift position detection section 41 that detects which of a plurality of shift positions including a neutral position and a parking position is selected; and control section 40 that actuates at least one of the plurality of synchromesh mechanisms (first synchromesh mechanism 61 and/or third synchromesh mechanism 63) other than the output-side synchromesh mechanism to couple between at least one of the plurality of rotary shafts other than the output shaft and at least one of the plurality of gears other than the output-side gear, in a case where the neutral position or the parking position is detected by shift position detection section 41.

With such a configuration, when the synchromesh mechanism included in the drive force transmission path of the starting stage is actuated, the time required from the operation of the shift lever to the start can be shortened. On the other hand, when the synchromesh mechanism not included in the drive force transmission path of the starting stage is actuated, the time required until the speed shifting to the next stage is possible after starting at the starting stage can be shortened.

<Variation>

Hereinabove, various embodiments have been described with reference to the drawings, the present disclosure is not limited to such examples. It will be apparent to those skilled in the art may arrive at various modifications or variations at within the scope of the claims, and it is naturally understood that they are also within the technical scope of the present disclosure. In addition, the components in the above embodiments may be optionally combined without departing from the spirit and scope of the disclosure.

In the above-mentioned embodiments, a description has been given by adopting a dual clutch type transmission as an example of automatic transmission 1, but the present invention is not limited to this. The present invention can be applied to an automatic transmission equipped with a synchromesh mechanism (synchronization mechanism).

In the above-mentioned embodiment, as illustrated in, for example, FIG. 1, a description has been given of automatic transmission 1 including two clutches, seven gear trains, two input shafts, two counter shafts and one output shaft, but the automatic transmission of the present invention is not limited to such a configuration. The number of clutches, gear trains, and rotary shafts may be changed as appropriate.

This application is based upon Japanese Patent Application No. 2019-057110, filed on Mar. 25, 2019, the entire contents of which are incorporated herein by reference.

INDUSTRIAL APPLICABILITY

The present disclosure can provide an automatic transmission that brings suitable drivability.

REFERENCE SIGNS LIST

1 Automatic transmission
2 Drive source output shaft
10 First clutch
11 Input-side clutch plate
12 Output-side clutch plate
20 Second clutch
21 Input-side clutch plate
22 Output-side clutch plate
30 Transmission section
31 First input shaft
32 Second input shaft
33 First counter shaft
34 Second counter shaft
35 Output shaft
40 Control section
41 Shift position detection section
51 First gear train
51a First input-side gear
51b First counter gear
52 Reverse gear train
52a Second input-side gear
52b Second counter gear
52c Reverse idler gear
53 Second gear train
53a Third input-side gear
53b Third counter gear
54 Third gear train
54a Fourth input-side gear
54b Fourth counter gear
55 Fourth gear train
55a First output-side gear
55b Fifth counter gear
56 Fifth gear train
56a Second output-side gear
56b Sixth counter gear
57 Sixth gear train
57a Third output-side gear
57b Seventh counter gear
61 First synchromesh mechanism
61a First synchronizer hub
61b First synchronizer sleeve
61c First dog gear
61d Second dog gear
62 Second synchromesh mechanism
62a Second synchronizer hub
62b Second synchronizer sleeve
62c Third dog gear
62d Fourth dog gear
63 Third synchromesh mechanism
63a Third synchronizer hub
63b Third synchronizer sleeve
63c Fifth dog gear
63d Sixth dog gear
64 Fourth synchromesh mechanism
64a Fourth synchronizer hub
64b Fourth synchronizer sleeve
64c Seventh dog gear
64d Eighth dog gear

What is claimed is:

1. An automatic transmission, comprising:
a plurality of rotary shafts including an output shaft that outputs a drive force;
a plurality of gears including an output-side gear provided on the output shaft;
a plurality of synchromesh mechanisms including an output-side synchromesh mechanism that couples between the output shaft and the output-side gear;
a shift position detection section that detects which of a plurality of shift positions including a neutral position and a parking position is selected; and
a control section that actuates at least one of the plurality of synchromesh mechanisms other than the output-side synchromesh mechanism and causes the at least one of the plurality of synchromesh mechanisms to couple between at least one of the plurality of rotary shafts other than the output shaft and at least one of the plurality of gears other than the output-side gear, in a case where the neutral position or the parking position is detected by the shift position detection section, wherein:

the plurality of rotary shafts includes a first input shaft including a first clutch capable of disconnecting the drive force and a second input shaft including a second clutch capable of disconnecting the drive force, the second input shaft being provided coaxially with the first input shaft, and the control section actuates, among the plurality of synchromesh mechanisms, a synchromesh mechanism in which the drive force is not transmitted to the output shaft even when either of the first clutch or the second clutch is connected, in a case where the neutral position or the parking position is detected by the shift position detection section.

\* \* \* \* \*